Dec. 3, 1968 E. A. BROWN 3,414,258

RECORD CARD FEEDING APPARATUS

Filed Dec. 12, 1966 2 Sheets-Sheet 1

INVENTOR.
EDGAR ALAN BROWN

BY Otto Schmid, Jr.
ATTORNEY

Dec. 3, 1968 E. A. BROWN 3,414,258

RECORD CARD FEEDING APPARATUS

Filed Dec. 12, 1966 2 Sheets-Sheet 2

United States Patent Office 3,414,258
Patented Dec. 3, 1968

3,414,258
RECORD CARD FEEDING APPARATUS

Edgar Alan Brown, Saratoga, Calif., assignor to International Business Machines Corporation, Armonk, N.Y., a corporation of New York Filed Dec. 12, 1966, Ser. No. 601,055
5 Claims. (Cl. 271—44)

ABSTRACT OF THE DISCLOSURE

A record card feeding apparatus including a hopper having a side member mounted a small angle from the vertical and a back member mounted a small angle backward from the card feeding direction. A card throat member is mounted at the front of the hopper to prevent all but the bottom card in the stack from being fed from the hopper, and a selectively actuable picker knife for feeding the bottom card from the stacker. The number of cards in the stacker is unlimited by considerations of card damage or feeding reliability.

*Background of the invention*

This invention relates to record card feeding and handling and more particularly to a record card feeding and handling device capable of handling a large number of cards.

As the operating speed of record card feeding machines has increased, the necessity for record card feeding devices capable of handling a large number of cards has become apparent. It has not been possible to substantially increase the number of cards in hoppers without damage to cards and greatly diminished reliability. It is, therefore, the primary object of this invention to provide a superior record card feeding apparatus capable of handling a large number of cards at high speed without damage as cards are fed one at a time from the bottom of a stack of cards.

It is another object of this invention to provide a record card feeding apparatus wherein the center of gravity of the stack of cards continually moves away from the card throat as the height of the deck is increased.

It is necessary that each card be in an exact position at the time the feeding means engages the card for feeding so that the data positions on the card are in proper position relative to the sensing devices of the machine into which the card is fed. For this reason, it has been customary to make the hopper sidewalls adjustable to compensate for the effects of tolerances, wear and differences in temperature, humidity and card stock. It is, therefore, another object of this invention to provide a card feeding apparatus which may have only one sidewall which permits feeding cards with the proper positional accuracy, thereby eliminating the need for adjustment to the hopper sidewalls.

It is a further object of this invention to provide a record card feeding apparatus which permits easy loading of cards either by hand or from a cartridge.

It is a still further object of this invention to provide a record card feeding apparatus which provides automatic right angle registration of cards.

It is another object of this invention to provide a record card feeding apparatus wherein the force at the throat normal to the card bed due to the card stack essentially levels off at a value compatible with feeding record cards reliably without damage as the height of the stack increases.

Briefly, according to the invention, there is provided apparatus for feeding record cards at high speed from a stack of cards comprising a card hopper means including a lateral restraining means disposed a small angle to the vertical and a longitudinal restraining means disposed a small angle backward from the vertical, means for feeding cards forward one at a time from the bottom of the stack and means for restraining movement of other cards in the stack.

The foregoing and other objects, features and advantages of the invention will be apparent from the following more particular description of a preferred embodiment of the invention as illustrated in the accompanying drawings.

Figure 1:
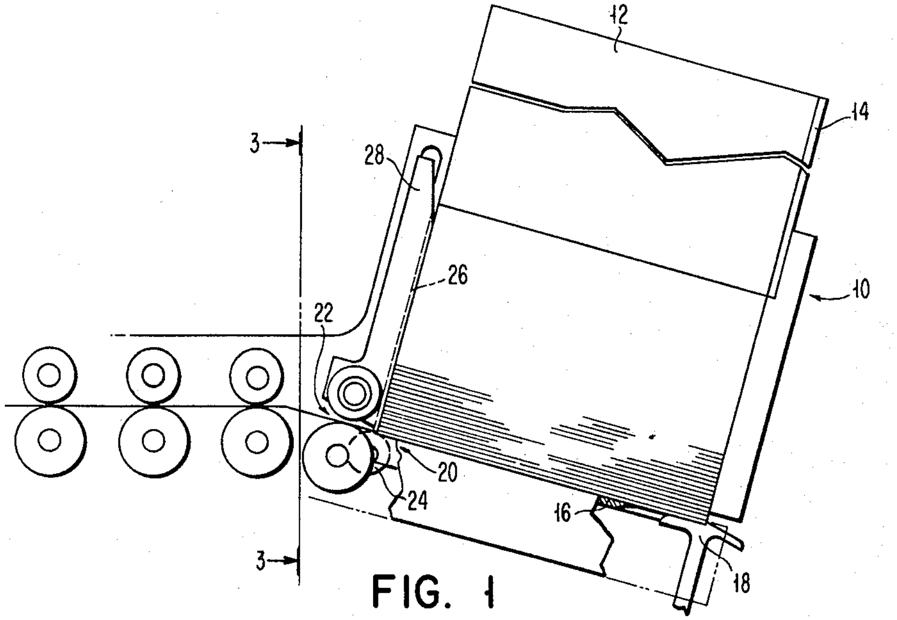
FIGURE 1 is a side view of the record card feeding apparatus embodying the invention.
Figure 2:
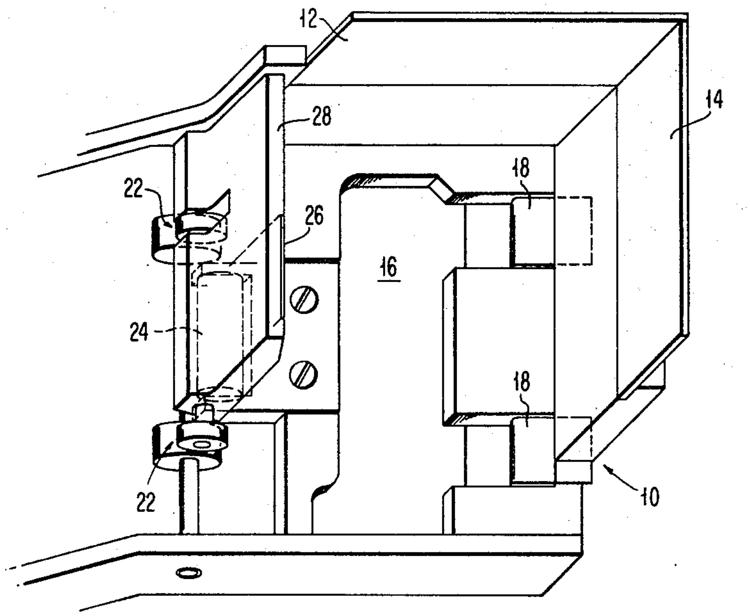
FIGURE 2 is a top view of the record card feeding apparatus embodying the invention.
Figure 3:
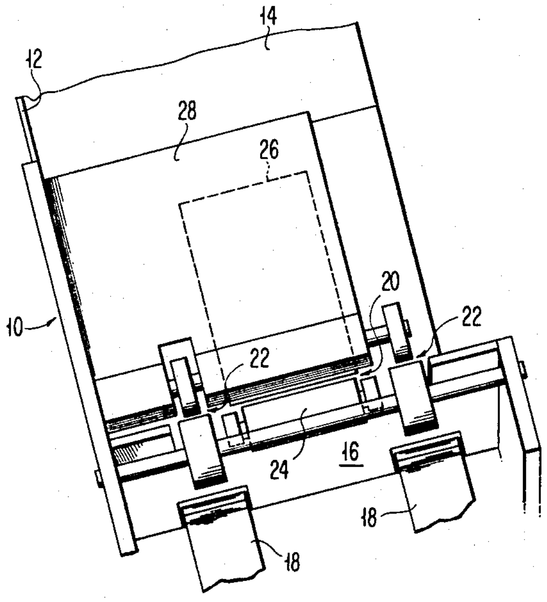
FIGURE 3 is a section view taken along lines 3—3 of FIGURE 1.

The record card feeding apparatus comprises hopper means 10 including a lateral restraining means 12 also referred to as sidewall restraining means, a longitudinal restraining means 14 also referred to as backwall restraining means and a base portion 16. A card feeding means 18 is disposed adjacent to the base portion 16 to feed the bottom card from a stack of cards disposed in hopper means 10 past a restraining means 20 for restricting the movement of the other cards in the stack. The lateral restraining means, the longitudinal restraining means and the base portion of the hopper means are assembled at substantially right angles to each other to form an enclosure for receiving a stack of cards. The hopper means is mounted with the longitudinal restraining means disposed a small angle backward from the vertical, and the lateral restraining means is disposed a small angle to one side of the vertical for positioning the cards laterally of the card feed direction.

The result is a card hopper means which has only a side member and a back member to register the cards for proper alignment to feed the cards through the utilization stations of the associated record card processing machine. The disposition of the hopper at a small angle backward and a small angle to the side from the straight-up position provides several advantages for the card hopper means. The first advantage is that the disposition of the hopper backward from the direction of feeding record cards causes the force on the bottom card in the hopper at the throat to increase to a certain level and then level off with a greater number of cards in the hopper. By suitably choosing the angle at which the hopper is tilted backward, the drag on the bottom card can be regulated to a value which does not result in damage to cards fed from the hopper without regard to the number of cards in the hopper.

Damage to cards fed from the hopper may be of two kinds. There is a possibility that the leading edges of the cards may be damaged adjacent to the feed throat due to the frictional force between the bottom card in the hopper being fed and the succeeding cards in the hopper. Another type of damage which may occur is damage caused by too great a load on the bottom card being fed by the picker knife which results in damage to the trailing edge of the cards. It has been found that by tilting the hopper back from the direction of feeding, the load on the bottom card can be regulated.

To obtain any benefit from tilting the hopper, the hopper must be tilted at an angle to the vertical at least equal to the fraction angle of the record cards. The friction angle is the angle at which the force of gravity just overcomes the shear frictional forces between cards in the card deck. On the other hand, the disposition of the hopper at too great an angle produces a greater frictional drag between the edges of the cards and the sides of the hopper so that a mechanically loaded card follower may become necessary. Since it is desired to have a hopper which may be easily loaded either by hand or from a cartridge, the mechanically biased card follower would be undesirable. Therefore, the angle at which the hopper is tipped is chosen greater than the friction angle of the cards and less than the angle at which a mechanical card follower becomes necessary. It will be recognized by those skilled in the art that the two limits of this angle will vary dependent upon the materials and finish of the hopper components, and also upon the type and condition of card stock being used. For a particular embodiment of the hopper an angle of approximately 15° to 30° proved to be a desirable range for the tilt of the hopper. In this embodiment it was found that the friction angle of the cards is approximately 10°, so an angle of 15° provided sufficient margin for variations in individual cards being used.

In the embodiment of the mechanism shown in the drawings, hopper means 10 is mounted for feeding cards by feed means 18 one at a time from the bottom of a stack past restraining means 20 to the left (FIG. 1) along a card path defined by feeding means 22. In the drawings the card paths is shown substantially horizontal, but it will be recognized by those skilled in the art that the card path could be disposed at any desired angle once the cards have been removed from hopper means 10.

Hopper means 10 comprises base portion 16, lateral restraining means 12 and longitudinal restraining means 14. The base portion 16 is mounted to the machine frame at an angle of 15° to the horizontal and also tipped backward at an angle of 15° to the horizontal. Lateral restraining means 12 comprises a substantially planar member fixed to base portion 16 at substantially a right angle so that the member forms a side wall extending at an angle of 15° from the vertical. The longitudinal restraining member 14 comprises substantially planar member mounted at a substantially right angle to both base member 16 and the side wall of the hopper so that the back wall of the hopper is formed extending at an angle of 15° from the vertical in a direction opposite to the direction in which the picker knives 18 move to feed a record card. The side wall and the back wall thus provide a right angle surface for registration of the record card since the hopper is tipped from the vertical a compound direction of 15° toward each of the hopper members.

The bottom card in the stack is positioned to be engaged by the picker knife and moved past restraining means 20 into feedrolls 22 which feed the card to the utilization stations of the machine. The fact that the cards are registered relative to the back wall of the hopper is an important advantage since it eliminates the chance that the trailing edge of the card may be damaged due to the card being accelerated into the hopper back posts on the return stroke of the picker knife.

Picker knife 18 may be selectively controlled by any suitable means (not shown). One suitable control mechanism is described in my copending application, Ser. No. 595,069 filed Nov. 17, 1966, now Patent No. 3,383,106 entitled "Record Card Feeding Control Apparatus."

In the embodiment shown, the restraining means comprises an idling roller 24, the peripheral surface of which is substantially even with base member 16 of the hopper. Spaced from idling roller 24 a distance equal to at least the thickness of one card, but less than the thickness of two cards, is a throat knife member 26. Throat knife member 26 is adjustably mounted to member 28 which is attached to the machine frame so that a gap sufficient for passage of one record card is formed between idling roller 24 and the throat knife 26. Throat knife 26 functions to restrain the rest of the cards in the stack from moving due to the frictional engagement with the bottom card. Feedrolls 22 are placed to engage the card to feed the card from the hopper to the utilization stations of the machine.

Figure 4:
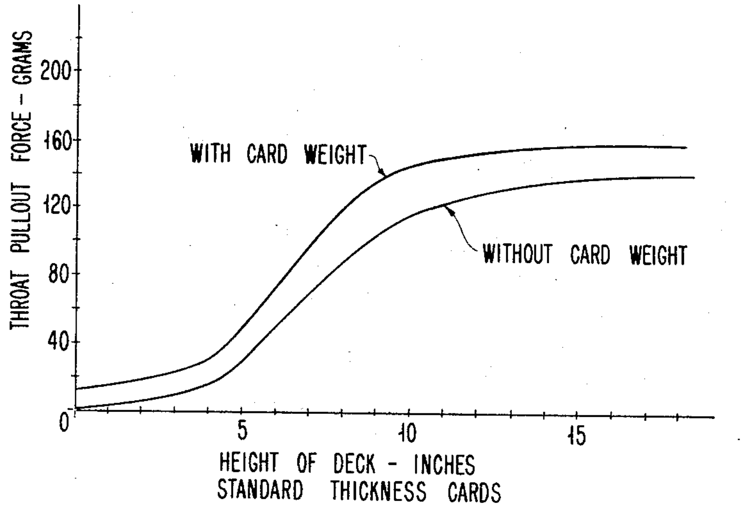
FIGURE 4 is a graph of the variation of the force required to pull out the bottom record card in a stack of cards vs. deck height of a card feeding device embodying the present invention.

The height of the stack of cards in hopper means 10 may be made any desirable height without resulting in card damage or unreliable feeding. As shown in FIGURE 4, the force at the throat required to feed the bottom card from the stack increases with the number of cards in the stack up to about a ten inch stack. There is little increase in force for additional cards and this force levels out below 160 grams for the illustrated embodiment. Thus there is provided a hopper which is easily loaded either by hand or from a card cartridge with a sufficient number of cards so that cards can be fed at a high speed without requiring constant operator attention. In addition, the requirement for only one side wall in the hopper permits cards of different lengths to be fed from the hopper without adjustment of the hopper. The only requirement to obtaining the desired positional accuracy is that the cards be registered against the side wall of the hopper.

While the invention has been particularly shown and described with reference to preferred embodiments thereof, it will be understood by those skilled in the art that various changes in the form and details may be made therein without departing from the spirit and scope of the invention.

What is claimed is:

1. Apparatus for feeding record cards from a stack of cards at high speed comprising:

a record card hopper means for receiving said stack of cards;

said record card hopper means comprising a sidewall restraining means tilted to the side of the vertical for automatically registering one edge of said record card stack against the sidewall;

backwall restraining means disposed at an angle backward from the vertical, said angle being at least equal to the friction angle between the record cards and less than the angle which produces frictional drag between the back edge of the cards and said backwall restraining means, whereby the stack in said hopper is at said angle creating a force that must be overcome to feed a card from the bottom of said stack of cards, which force remains substantially constant regardless of the height of the stack;

means for feeding record cards one at a time from the bottom of said stack; and means for restraining movement of the other record cards in the stack.

2. The record card feeding means according to claim 1 wherein said means for feeding record cards comprises a picker knife.

3. The record feeding means according to claim 2 wherein said means for restraining movement of said other cards comprises a card throat member.

4. The record card feeding means according to claim 1 wherein each of said first and second small angles to the vertical are within the range of 15 to 30 degrees.

5. Apparatus for feeding record cards from a stack of cards at high speed along a card path comprising:

a record card nopper means for receiving said stack of cards, said record card hopper means comprising a bottom member, a back member and a side member, each coupled together at substantially right angles to the other members;

throat defining means mounted adjacent to the bottom member opposite said back member, said throat defining means comprising members spaced to pass only the bottom card in said stack and to restrain movement of the other cards in said stack;

means for mounting said record card hopper means so that said back member is at an angle of approximately 15° to the vertical away from said throat defining means and so that said side member is at an angle of 75° to the horizontal, whereby the stack in said hopper is at said 15° to the vertical creating a force that must be overcome to feed a card from the bottom of said stack of cards which force remains substantially constant regardless of the height of the stack; and picker knife means mounted to engage the edge of the bottom card in said stack adjacent to said back member to feed cards one at a time from said hopper means along the card path.

References Cited

UNITED STATES PATENTS

| | | | |
|---|---|---|---|
| 3,145,023 | 8/1964 | Cerf | 271—44 |
| 3,244,081 | 4/1966 | Randles | 271—41 |
| 3,259,239 | 7/1966 | Elliott | 209—73 |
| 3,290,042 | 12/1966 | Johnson | 271—44 |

RICHARD E. AEGERTER, *Primary Examiner.*